Mar. 3, 1925.

L. MAILMAN

DRIP PAN ALARM

Filed July 30, 1924

1,528,736

LOUIS MAILMAN INVENTOR.

WITNESSES
Albert Baker
Edgar P Bolton

BY R. W. Smith
ATTORNEY.

Patented Mar. 3, 1925.

1,528,736

UNITED STATES PATENT OFFICE.

LOUIS MAILMAN, OF LOS ANGELES, CALIFORNIA.

DRIP-PAN ALARM.

Application filed July 30, 1924. Serial No. 729,063.

*To all whom it may concern:*

Be it known that I, LOUIS MAILMAN, a citizen of the United States, residing at Los Angeles, in the county of Los Angeles and State of California, have invented certain new and useful Improvements in Drip-Pan Alarms, of which the following is a specification.

It is the object of this invention to provide a drip pan alarm of extremely simple construction, the signaling means comprising a usual spring operated gong connected to a float which is movable in accordance with the liquid level in the pan, so that the push button of the gong will be normally held against the action of an operating spring, and will be released by movement of the float as the liquid rises to a predetermined level, to permit depression of said push button by said operating spring in order to sound the gong.

It is a further object of the invention to provide automatic means for retracting the push button of the gong against the action of the operating spring after the gong has been sounded for a short period, and to repeat the alarm at intervals as the liquid level continues to rise.

The invention will be readily understood from the following description of the accompanying drawings, in which.

Figure 1:
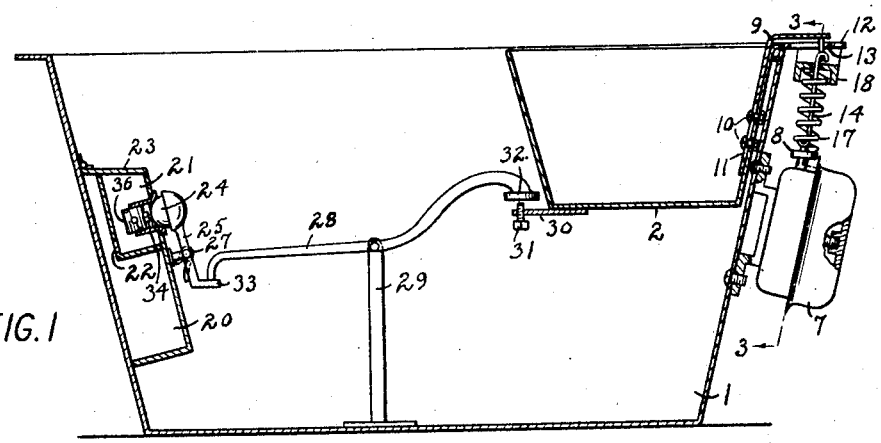
Fig. 1 is a vertical section through a drip pan constructed in accordance with the invention.
Figure 2:
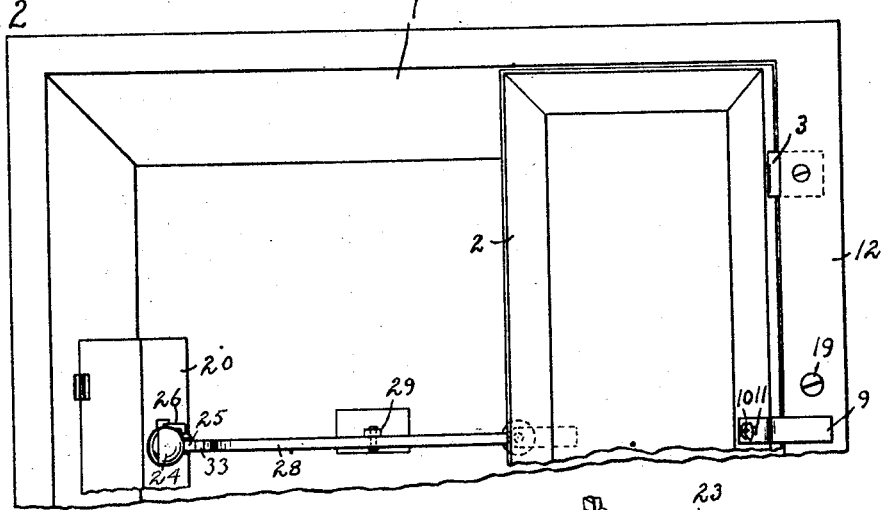
Fig. 2 is a fragmentary plan view of the same.
Figure 3:
Fig. 3 is a detail section on the line 3—3 of Fig. 1.
Figure 4:
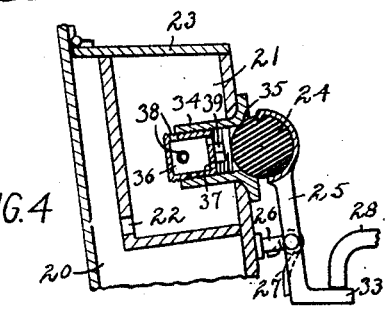
Fig. 4 is a detail vertical section through the repeater mechanism.

The drip pan 1 has a float 2 hinged thereto at its upper edge as shown at 3, said float swinging downwardly into the pan to the position shown in Fig. 1, when the level of the liquid in said pan is below the float.

A gong is mounted on the outer side of the wall of the pan and preferably comprises a clapper 4, vibrated by a main spring 5 through escapement gearing 6, so as to strike the casing 7 and sound the gong. The clapper is normally held against movement by a push button 8 projecting from the side of the gong and adapted to be depressed so as to release said clapper and sound the alarm.

An operating connection between float 2 and the push button 8, is illustrated as comprising an arm 9 fixed to the float and adapted for vertical adjustment thereon by supporting screws 10 received through an elongated slot 11 in said arm. The end of the arm projects from the float over the rim 12 of the drip pan and overlies an aperture 13 provided in said rim above the gong mechanism.

The end of arm 9 and push button 8 are connected by a rod 14 which is secured to eyes 15 and 16 depending from the arm through aperture 13 and mounted on said push button respectively, the connecting rod holding the push button in position to prevent release of clapper 4 when float 2 is swung downwardly into the drip pan.

When the float is swung upwardly by the rise of the liquid level in the drip pan, the pull exerted through rod 14 on push button 8 is released, and the push button is depressed by a spring 17 so as to release the clapper and sound the gong.

Spring 17 is preferably a coil spring received around rod 14 with one end thereof abutting against push button 8, and its opposite end received in and abutting against a guide 18, which is mounted on rim 12 by screws 19 with the operating rod freely slidable through said guide.

In order to stop the gong after sounding the same for a short period, the liquid in the drip pan is adapted to overflow, so as to lower the liquid level and thereby permit float 2 to again swing downwardly and retract push button 8 against the action of spring 17.

When the liquid level again rises so as to swing the float upwardly, sounding of the gong is repeated, and alternate silencing and sounding of the alarm will continue until the drip pan is emptied.

The overflow from the drip pan comprises a casing 20 mounted on the inside of the wall of the pan opposite float 2, and having an intake port communicating with a pocket 21 in said casing, which discharges through a port 22 into the lower part of the casing. The lower portion of the casing is open to the top thereof in rear of pocket 21, and the casing is provided with a hinged lid 23 adapted to be swung open when the drip pan is tilted for emptying the same, so that the liquid in said casing will also be emptied therefrom.

The intake port for pocket 21 is normally closed, and is adapted to be opened by upward swinging of float 2, to permit discharge of the liquid from pan 1 into said pocket and thence into the lower part of casing 20, the resulting lowering of the liquid level in the drip pan permitting the float to again swing downwardly and closing the port in the overflow pocket.

As an instance of this arrangement the port in pocket 21 may be controlled by a ball valve 24, mounted on a lever 25 which is pivoted on a bracket 26 and provided with a spring 27 tending to swing said lever so as to close the valve. A rocker arm 28 is pivoted on a bracket 29 which is mounted on the base of pan 1, and is adapted to swing lever 25 against the action of its spring so as to open valve 24, when float 2 is swung upwardly.

The operating connection between the float and the rocker arm comprises an extension 30 on the base of the float having a set screw 31 adjustable therethrough, said set screw abutting against a head 32 on one end of the rocker arm for depressing the opposite end thereof against an extension 33 on the end of lever 25.

The gong will thus be sounded by a rise in the liquid level in pan 1 swinging float 2 upwardly and opening valve 24, until the overflow into pocket 21 lowers said liquid level so as to permit the float to swing downwardly and close the valve, and the rate of discharge into pocket 21 will therefore determine the length of the period the gong is sounded.

Means are provided for adjusting the rate of discharge when valve 24 is opened, and preferably comprise a tube 34 mounted in pocket 21 at its intake port and forming a valve seat 35 for the ball valve 24. A plug 36 which is threaded in tube 34 for axial adjustment of said plug, is a hollow closed structure having intake ports 37 at its end adjacent valve 24, and spirally spaced peripheral ports 38 at its opposite end.

A head 39 adapted to be engaged by a suitable tool, is provided on the outer end of the plug for threading the same back and forth in tube 34, and thereby moving one or more of the ports 38 into open position beyond the inner end of said tube. By this arrangement the rate of discharge from pan 1 through the hollow plug and thence through ports 38 into pocket 21 is controlled by the number of said ports which are in open position.

The construction as thus described provides extremely simple spring operated means for sounding a gong when the liquid in a drip pan reaches a predetermined level, and also provides for silencing the gong and repeating the sounding thereof at predetermined intervals until the pan is emptied.

It will be apparent that various changes may be made in the construction, combination, and arrangement of parts as thus described, without departing from the spirit of the invention.

1. An alarm for a receptacle comprising a liquid operated float, a gong for said receptacle, a spring tending to sound said gong, an arm fixed to said gong and connected to said float for releasably holding said gong against sounding, and means for adjusting the connection between said arm and said float to vary the point of release of said gong.

2. An alarm for a receptacle comprising a signal, a float movable in accordance with the level of a liquid in said receptacle, a connection between said float and said signal for actuating the latter when the float is elevated by a predetermined level of the liquid in the receptacle, a normally closed overflow for the liquid in said receptacle which exceeds said predetermined level, and means actuated by elevation of the float for opening said overflow.

3. An alarm for a receptacle comprising a signal, a float movable in accordance with the level of a liquid in said receptacle, a connection between said float and said signal for actuating the latter when the float is elevated by a predetermined level of the liquid in the receptacle, a normally closed overflow for the liquid in said receptacle which exceeds said predetermined level, means actuated by said elevation of the float for opening said overflow when the liquid in the receptacle exceeds said predetermined level, and means for adjusting the rate of discharge through said overflow.

4. An alarm for a receptacle comprising a signal, a float movable in accordance with the level of a liquid in said receptacle, a connection between said float and said signal for actuating the latter when the float is elevated by a predetermined level of the liquid in the receptacle, a normally closed overflow for the liquid in said receptacle which exceeds said predetermined level, means actuated by said elevation of the float for opening said overflow, and means for adjusting said actuated means to cause said opening of the overflow when the liquid in the receptacle exceeds said predetermined level to a predetermined height.

5. An alarm for a receptacle comprising a signal, a float movable in accordance with the level of a liquid in said receptacle, a connection between said float and said signal for actuating the latter when the float is elevated by a predetermined level of the liquid in the receptacle, a normally closed overflow for the liquid in said receptacle which exceeds said predetermined level, means actuated by said elevation of the float for opening said overflow, means for adjusting said actuated means to cause said opening of the overflow when the liquid in the receptacle exceeds said predetermined level to a predetermined height, and means for adjusting the rate of discharge through said overflow.

In testimony whereof I have affixed my signature to this specification.

LOUIS MAILMAN.

Witnesses:
ALBERT BAKER,
EDGAR P. BOLTON.